Figure 1:
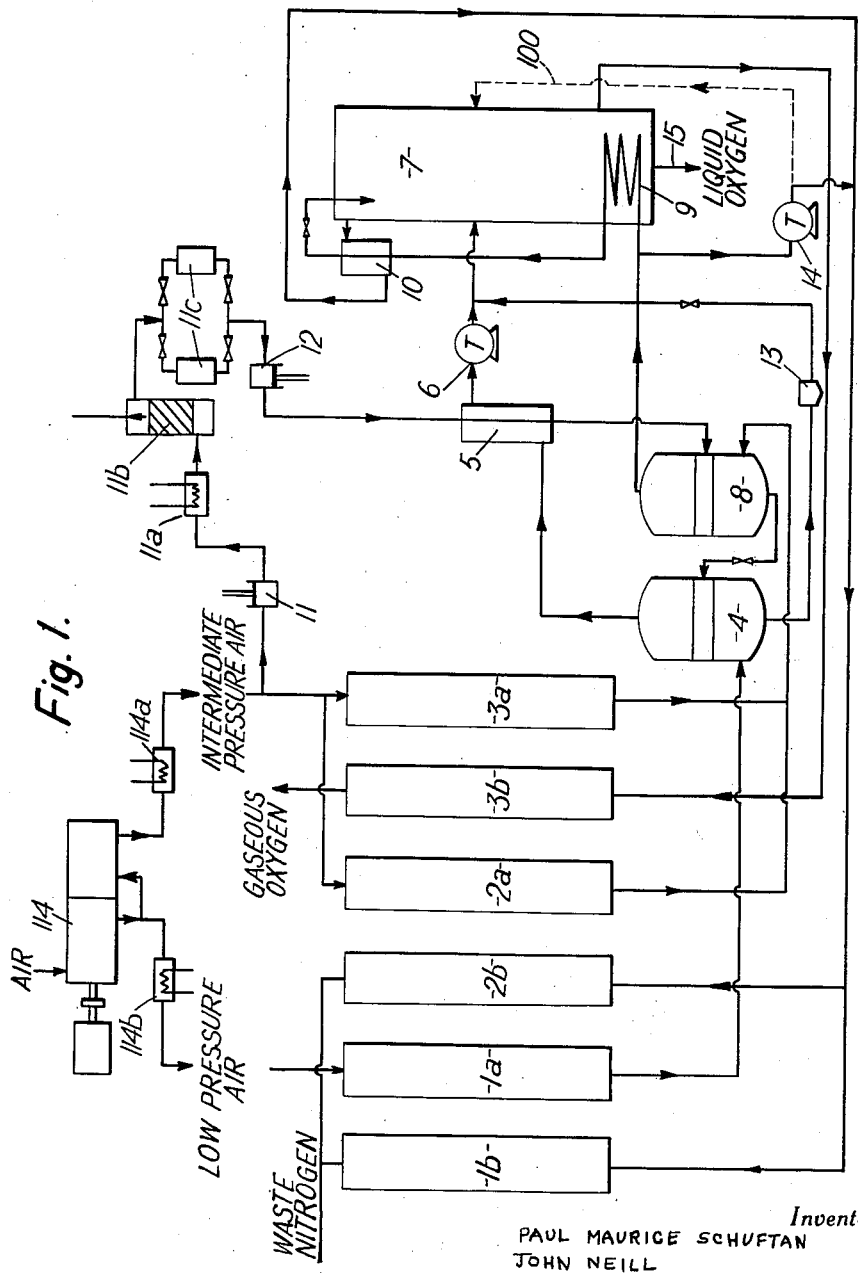

Dec. 20, 1960 P. M. SCHUFTAN ET AL 2,964,914
SEPARATION OF AIR
Filed May 11, 1956 2 Sheets-Sheet 1

Inventor
PAUL MAURICE SCHUFTAN
JOHN NEILL
By
Aaron R. Townshend Attorney

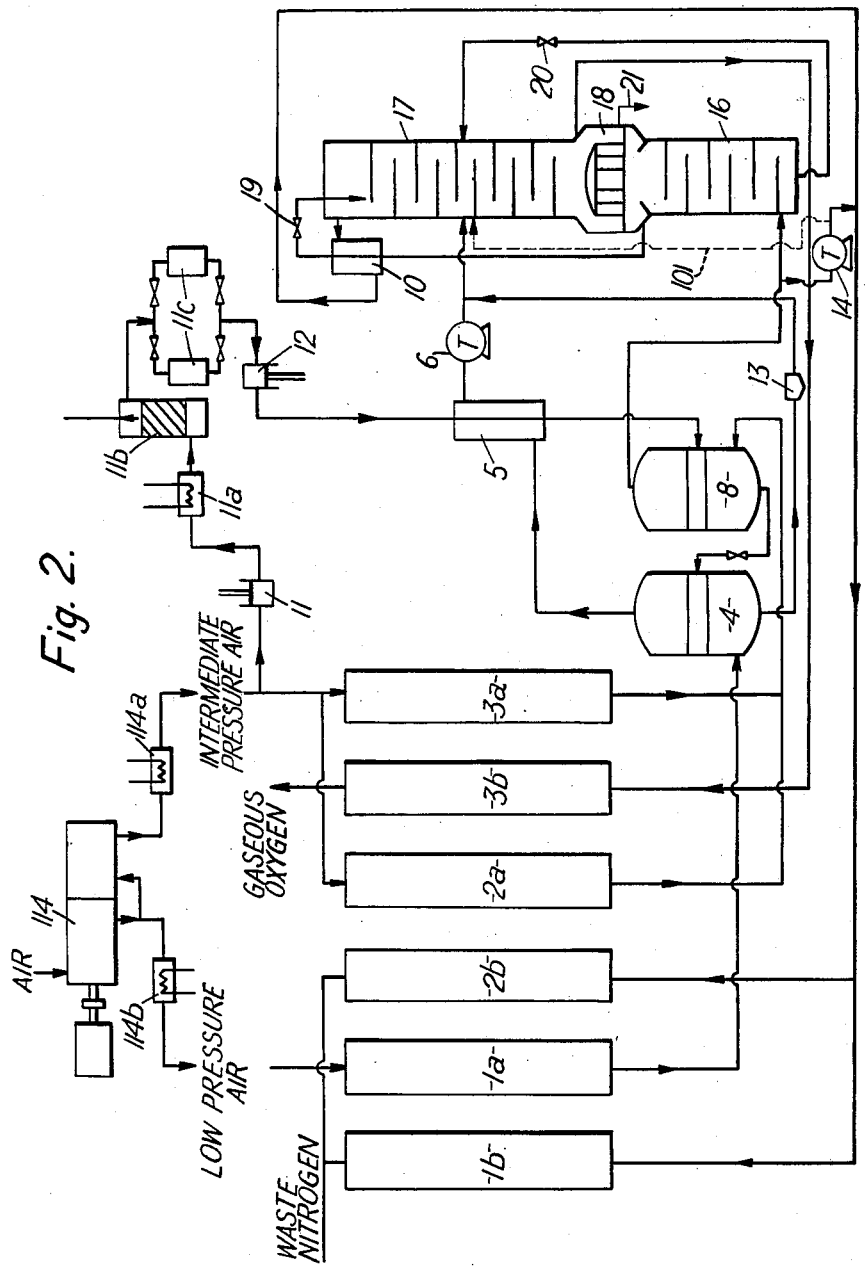

United States Patent Office 2,964,914
Patented Dec. 20, 1960

2,964,914

SEPARATION OF AIR

Paul Maurice Schuftan, Richmond Hill, and John Neill, Wolverhampton, England, assignors to The British Oxygen Company Limited, a British company Filed May 11, 1956, Ser. No. 584,278

Claims priority, application Great Britain May 12, 1955

1 Claim. (Cl. 62—14)

This invention relates to the separation of air by liquefaction and rectification.

In such processes the gas mixture is compressed, cooled by heat exchange with effluent separation products, expanded to the liquefaction point and then subjected to rectification. In processes of this type, if the separation products are to be recovered in the gaseous state, only sufficient cold need be produced to compensate for cold losses due to heat influx and unavoidable heat exchange losses (hereinafter referred to as "normal refrigeration"). If a separation product is to be recovered in the liquid state, cold additional to that required for normal refrigeration must be provided. Such additional cold will hereinafter be referred to as "supplementary cold."

It is an object of the present invention to provide a method of operating an air separation process wherein the gas to liquid ratio of the desired separation product can be adjusted readily and economically.

In accordance with this invention, a process for the separation of air by compression, liquefaction and rectification wherein compressed air or a separation product thereof is used to maintain a temperature gradient in a rectification zone, includes the step of diverting a part of the compressed air or the separation product prior to such use and subjecting it to isentropic expansion to produce supplementary cold, as hereinbefore defined. Such supplementary cold may be utilised to permit a part of a separation product to be withdrawn in the liquid state, the proportion of the compressed air utilised for the production of supplementary cold being adjusted in conformity with the ratio of liquid to gaseous separation product required.

The term "isentropic expansion" as used herein implies expansion in a machine with the recovery of external work and the production of cold and is to be understood to include the entropy increase inevitably resulting from the imperfections known to exist in all such machines. The term "turbine" is intended to include any machine in which a work performing expansion is carried out.

When providing supplementary cold, the total output of the desired separation product is reduced, but a proportion is recovered in the liquid phase.

The invention is particularly advantageous when applied to a separation process designed to supply a fluctuating demand for the desired separation product in the gaseous phase.

In such processes small fluctuations in demand can be overcome by storing the excess gas produced, but large decreases in the demand would require a very large gas storage capacity which would be quite uneconomic. By controlling the gas/liquid ratio in accordance with the present invention, the excess product not required as gas can be obtained as liquid which can be much more easily stored than an equivalent quantity of gas.

The liquid as produced can be used for a variety of purposes. For example, it may be converted to gas to meet an intermittent high demand in excess of the capacity of the plant or to maintain a supply during total shut down of the separation plant. Alternatively, the liquid may be readily transported to a point of use.

A further advantage of the present invention is that the supplementary cold may be used to accelerate initial cooling down of the separation plant. In this case, the object is not to produce liquid, but to increase the total cold available in the rectification zone at the time of start-up.

The invention will now be described as an example in further detail with reference to Figures 1 and 2 of the accompanying drawings which, as examples, show diagrammatically two forms of apparatus capable of performing the methods of the invention. Like parts in both figures bear the same reference numerals.

For the sake of clarity and to avoid undue elaboration of the description several features for carrying the process into effect, which are well known per se to those skilled in the art, have been omitted from the drawings. It will be appreciated, for example, that the temperature of the waste nitrogen must be adjusted before entering the regenerators and that a change-over valve mechanism has to be provided for sets of associated regenerators. All such features are well known and have been omitted in the interests of simplicity. In the drawings regenerators are shown as alternating heat exchangers and each pair of associated regenerators bears the same reference numeral and are marked respectively (a) or (b), the suffix (a) being applied to the cooling regenerator and (b) to the regenerator which is in the course of being cooled. Direction of flow along the interconnecting pipe work is everywhere shown by arrows.

By the term "equaliser" as used herein, is meant an apparatus for bringing into intimate contact vapour and liquid streams, in order to smooth out fluctuations in the vapour temperature and to scrub the vapour with the liquid thus removing impurities from the vapour.

It is to be understood that the term regenerator is intended to include reversible heat exchangers.

Referring to Figure 1, which shows the application of the invention to a single column cycle, the air entering the plant is compressed in compressor 114 and divided into two major streams, one at about 2.6 atma. (hereinafter called low pressure air), the other at about 4.8 atma. (hereinafter called intermediate pressure air).

The low pressure air is cooled to ambient temperature in aftercooler 114b and is then cooled in regenerator 1a to a temperature near its liquefaction point and is scrubbed with liquid air in an equaliser 4. In this way the low pressure air is brought to the dew point and residual impurities are removed. The vapour leaving the equaliser is heated in an exchanger 5, subjected to isentropic expansion in a turbine 6, and fed into a rectification column 7 at an intermediate point. The liquid air leaving the equaliser is filtered through filter 13 and passed into the rectification column 7 at about the same point.

The intermediate pressure air is cooled to ambient temperature in aftercooler 114a and is then cooled in a similar manner in regenerators 2 and 3 and scrubbed with liquid air in an equaliser 8. The intermediate pressure air vapour leaving the equaliser is condensed in a condenser 9 by indirect heat exchange with boiling oxygen in the column 7 and the resultant liquid sub-cooled in a sub-cooler 10 before expansion into the top of the column 7, where it serves as liquid reflux for the separation. The liquid air leaving the equaliser 8 is passed to the equaliser 4.

A small fraction of the intermediate pressure air is diverted before the regenerators, compressed to a high pressure in a compressor 11, cooled to ambient temperature in an aftercooler 11a, freed from carbon dioxide in a purification tower 11b, dried in one of a pair of alternating driers 11c and expanded in and expansion engine 12. The relatively cold expanded high pressure air from the engine is further cooled and partially liquefied in exchanger 5 by heat exchange with the low pressure air and expanded into the equaliser 8 where it serves to scrub the intermediate pressure air from the regenerators.

The expanded high pressure air may, if desired, also be used to perform other duties, such as heating the waste nitrogen passing to the regenerators.

The air streams entering the column 7 are separated into the required waste nitrogen and gaseous oxygen products. The waste nitrogen leaving the column is warmed in the sub-cooler 10 and heated to substantially atmospheric temperature in the regenerators 1b and 2b. A gaseous oxygen fraction is withdrawn from the column and similarly heated in regenerator 3b. Any liquid oxygen produced is extracted from the column sump and passed to storage.

In accordance with the invention, when supplementary cold is required, a part of the intermediate pressure air leaving the equaliser 8 is not condensed in condenser 9 but is diverted and expanded in the turbine 14. The expanded air is mixed with effluent nitrogen from the column 7 and led out of the plant through the regenerators 1b and 2b. Alternatively, the expanded air may be fed into the column 7 at about the same point as the air stream leaving turbine 6 through pipe 100.

This leads to the production of liquid oxygen at the expense of total yield of separation products, and this liquid is withdrawn from column 7 through a pipe 15 and passed to storage. By adjusting the amount of air expanded in turbine 14, the amount of liquid oxygen produced can be varied.

The arrangement shown in Figure 2 is essentially similar to that of Figure 1 except that a double column is used, consisting of a lower rectification column 16 and an upper rectification column 17. The low pressure air stream expanded in turbine 6 is fed to an intermediate point in the upper column 17. The intermediate pressure air leaving the equaliser 8 is fed to the lower column 16 and is there separated into nitrogen rich and oxygen rich fractions. The nitrogen rich fraction is condensed in condenser 18 by indirect heat exchange with boiling oxygen at the bottom of column 17. Part of the condensed nitrogen rich fraction is returned as reflux liquid to column 16, while the remainder is expanded through valve 19 and fed into the top of column 17. The oxygen rich fraction collects as liquid at the bottom of column 16 and is expanded through valve 20 and fed to column 16 at about the same point as the low pressure air stream.

In accordance with the invention, when supplementary cold is required, part of the air stream leaving the equaliser 8 is not fed to the column 16 but is diverted and expanded in turbine 14. The expanded air is mixed with the effluent nitrogen from the top of the upper column 17 and led out of the plant through regenerators 1b and 2b. Alternatively, the explanded air may be fed into the column 17 at about the same point as the low pressure air stream through pipe 101.

This leads to the production of liquid oxygen, at the expense of total yield of separation products, and this liquid is withdrawn from the bottom of the upper column 16 through pipe 21 and passed to storage. By adjusting the amount of air expanded in turbine 14 the amount of liquid oxygen produced may be varied.

We claim:

Process for the separation of air to provide a gaseous oxygen fraction, a liquid oxygen fraction and a gaseous nitrogen fraction, which comprises compressing a first air stream to a relatively low pressure, cooling said compressed first air stream by heat exchange with a part of said gaseous nitrogen fraction, isentropically expanding said compressed cooled air stream to provide cold sufficient to compensate for cold losses and unavoidable heat exchange losses in the plant, feeding said expanded first air stream into a single rectification column, compressing a second air stream to a higher pressure than said first air stream, cooling said compressed second air stream by heat exchange with the remainder of said gaseous nitrogen fraction and said gaseous fraction, dividing said cooled compressed second air stream into a third and a fourth air stream, condensing said third air stream by heat exchange with liquid oxygen at the bottom of said rectification column, expanding said condensed third air stream, feeding said expanded condensed third air stream into the top of said rectification column to serve as reflux therein, isentropically expanding said fourth air stream to produce cold additional to the cold required to compensate for heat losses and unavoidable heat exchange losses, adding said expanded fourth air stream to said gaseous nitrogen fraction, prior to its passage in heat exchange relationship with said first and second air streams, whereby said additional cold is transferred to said first and second air streams, withdrawing said gaseous nitrogen fraction from the top of said column and withdrawing said gaseous oxygen fraction and said liquid oxygen fraction from the bottom of said column, the volume of said fourth air stream being adjusted in accordance with the ratio of liquid to gaseous oxygen required.

References Cited in the file of this patent

UNITED STATES PATENTS

| Re. 23,463 | Jenny | Feb. 26, 1952 |
| 1,157,959 | Place | Oct. 26, 1915 |
| 1,615,597 | Seligmann | Jan. 25, 1927 |
| 1,830,157 | De Baufre | Nov. 3, 1931 |
| 1,996,519 | Levin | Apr. 2, 1935 |
| 2,517,134 | Rice | Aug. 1, 1950 |
| 2,541,409 | Cornelius | Feb. 13, 1951 |
| 2,552,559 | Jenny | May 15, 1951 |
| 2,572,933 | Houvener | Oct. 30, 1951 |
| 2,619,810 | Rice et al. | Dec. 2, 1952 |
| 2,663,168 | Schilling | Dec. 22, 1953 |
| 2,673,456 | Scharmann | Mar. 30, 1954 |
| 2,680,357 | Collins | June 8, 1954 |
| 2,873,583 | Potts et al. | Feb. 17, 1959 |